(12) United States Patent
Rütti et al.

(10) Patent No.: US 12,460,997 B2
(45) Date of Patent: Nov. 4, 2025

(54) METHOD FOR CHECKING THE FUNCTIONALITY OF A VIBRATORY CONVEYOR DEVICE

(71) Applicant: Krämer AG, Bassersdorf (CH)

(72) Inventors: Mario Rütti, Illnau (CH); Tobias Frech, Dübendorf (CH); Horst Fischer, Lauchringen (DE)

(73) Assignee: KRÄMER AG, Bassersdorf (CH)

(*) Notice: Subject to any disclaimer, the term of this patent is extended or adjusted under 35 U.S.C. 154(b) by 473 days.

(21) Appl. No.: 17/919,140

(22) PCT Filed: Jan. 28, 2021

(86) PCT No.: PCT/CH2021/050002
§ 371 (c)(1),
(2) Date: Oct. 14, 2022

(87) PCT Pub. No.: WO2021/212241
PCT Pub. Date: Oct. 28, 2021

(65) Prior Publication Data
US 2023/0184633 A1    Jun. 15, 2023

(30) Foreign Application Priority Data
Apr. 21, 2020   (CH) ..................... 00466/20

(51) Int. Cl.
G01M 99/00    (2011.01)
B65G 27/24    (2006.01)
B65G 27/32    (2006.01)

(52) U.S. Cl.
CPC ........... *G01M 99/005* (2013.01); *B65G 27/24* (2013.01); *B65G 27/32* (2013.01)

(58) Field of Classification Search
None
See application file for complete search history.

(56) References Cited

U.S. PATENT DOCUMENTS

| 5,472,079 A | * | 12/1995 | Yagi | ................ | G05D 19/02 |
| | | | | | 198/756 |
| 6,079,549 A | * | 6/2000 | Meitinger | ............ | B65G 27/32 |
| | | | | | 198/762 |

(Continued)

FOREIGN PATENT DOCUMENTS

| CA | 3031151 A1 | 5/2018 |
| CN | 107352227 A | 11/2017 |

(Continued)

OTHER PUBLICATIONS

International Search Report dated Jun. 29, 2021 filed in PCT/CH2021/050002.

*Primary Examiner* — Kavel Singh
(74) *Attorney, Agent, or Firm* — Rankin, Hill & Clark LLP

(57) ABSTRACT

A method for checking the functionality of a vibratory conveyor device (1) by means of a status analysis which is carried out either before operation or during operation of the vibratory conveyor device (1), wherein A) the method to be carried out before operation comprises the following steps: A1) applying a drive pulse to a drive device (2) of the vibratory conveyor device (1); A2) detecting the pulse response caused by the vibratory conveyor device (1); A3) passing on the detected pulse response by way of the signal evaluation unit (5) to a computer (6); A4) comparing the detected pulse response to a reference pulse response by means of the computer (6); and A5) ascertaining by means of the computer (6) whether: a) a starting procedure for operation with reduced starting drive power of the vibratory conveyor device (1) is to be activated, or b) a starting procedure for operation without reduced starting drive power of the vibratory conveyor device (1) is to be activated, or c) the operation is to be suspended; B) the method to be carried out during operation comprises the following steps:

(Continued)

B1) detecting the voltage amplitude, frequency, acceleration, and temperature, caused by the vibratory conveyor device (1), in operation of the vibratory conveyor device (1) by means of the signal evaluation unit (5); and B2) passing on the detected voltage amplitude, frequency, acceleration, and temperature by way of the signal evaluation unit (5) to a computer (6).

8 Claims, 4 Drawing Sheets

(56) References Cited

U.S. PATENT DOCUMENTS

| | | | | |
|---|---|---|---|---|
| 6,308,822 | B1* | 10/2001 | Moran | B65G 27/32 |
| | | | | 198/762 |
| 8,251,204 | B1* | 8/2012 | Mazza | B65G 27/24 |
| | | | | 198/758 |
| 10,006,802 | B2* | 6/2018 | Kageyama | B65G 27/32 |
| 11,780,679 | B2* | 10/2023 | Savoie-Lavigueur | B07C 5/02 |
| | | | | 53/493 |
| 11,820,602 | B2* | 11/2023 | Ludescher | B65G 27/26 |
| 2003/0111323 | A1 | 6/2003 | Baird et al. | |
| 2004/0020748 | A1 | 2/2004 | Kramer | |
| 2019/0265689 | A1 | 8/2019 | Schaefer | |

FOREIGN PATENT DOCUMENTS

| | | |
|---|---|---|
| DE | 202008006747 U1 | 8/2008 |
| DE | 202011101642 U1 | 8/2011 |
| DE | 102018203814 A1 | 9/2019 |
| EP | 1322533 B1 | 4/2004 |
| WO | 0228751 A1 | 4/2002 |

\* cited by examiner

METHOD FOR CHECKING THE FUNCTIONALITY OF A VIBRATORY CONVEYOR DEVICE

The invention relates to a method for checking the functionality of a vibratory conveyor device and to a drive device for a vibratory conveyor device.

A vibratory conveyor device for dusting and deburring tablets is known from the document EP 1 322 533 B1 KRÄMER. This known vibratory conveyor device essentially comprises a helical conveyor channel, a drive device, by means of which the conveyor channel is set into a vibration, and an extraction device for extracting dust out of the region of the conveyor channel.

In this known vibratory conveyor device, however, flaws on the conveyor channel or a difficult start of behavior of the vibratory conveyor device caused due to long shutdown times when starting the device cannot be detected and taken into consideration immediately. Moreover, fault states can occur in operation of the vibratory conveyor device, which can damage the drive device and conveyor channel.

The invention wishes to provide a remedy here. The invention is based on the object of creating a method for producing a status analysis of the vibratory conveyor device to subsequently be able to make a statement about the functionality.

The invention achieves the stated object with a method for checking the functionality of a vibratory conveyor device as disclosed and claimed herein and with a drive device for a vibratory conveyor device as disclosed and claimed herein.

The advantages achieved by the invention can essentially be seen in that thanks to the method according to the invention:

A) before operation:
  on the basis of the comparison of the pulse response to a reference pulse response, deficiencies on the conveyor channel, for example, an incorrect installation of the conveyor channel or a supervision of the spring rate when starting the vibratory conveyor device are detectable, so that in such cases switching on of the drive device can be prevented; and
  disturbances of the startup behavior of the drive devices which can occur due to long shutdown times are detectable. In such vibratory conveyor devices, long shutdown times can occur, due to which the drive device can have a differentiated started behavior. In known vibratory conveyor devices, however, this behavior is not taken into consideration by the controller, due to which increased mechanical stresses of the device and thus the defect thereof can occur. On the basis of the evaluation of the pulse response, this circumstance can be ascertained early and taken into consideration when switching on the vibratory conveyor device.

B) during the operation, the detected values for the parameters voltage amplitude, frequency, acceleration, and temperature can be used further for, e.g.:
  a comparison of the detected values for the parameters to tolerance bands so that it can be decided whether the operation of the vibratory conveyor device is to be continued or suspended with output of an error message; and/or
  after the operation, the detected values for the parameters can be compared to stored long-term data so that a tendency toward change can be recognized and it can be decided whether a warning message is to be output or whether a later startup can take place in a standard manner.

A number of technical terms important for the invention are defined in greater detail hereinafter as follows:

Pulse Response (111)

A pulse response refers hereinafter to the output signal of a vibratory device in which a needle pulse (Dirac pulse) is applied as an input signal.

According to the invention, the output variable, i.e., the pulse response is to be generated on the basis of a pulse (input signal). The excitation is impulsive here, thus extremely short in comparison to the oscillation time of the device. The unity pulse function (input signal) consists of an approximated needle pulse (Dirac pulse). Although such a needle pulse cannot physically be implemented exactly, from the response behavior (output variable) upon excitations using short pulse and high amplitude, a statement can be read with respect to dynamic properties such as natural frequency and damping.

If all conveyor spirals are correctly installed, and no change in the spring rate and no long-term damage on the drive device are present, the vibratory conveyor device is in the normal state. The deflection behavior (output variable) can be detected and analyzed by supplying the above-mentioned pulse (input signal). This behavior is now considered the reference behavior—this applies in the time range and the frequency range. If no conveyor channel (conveyor spiral) is installed on the drive device, the vibration behavior after the supplied and predefined pulse is different than if the conveyor channel (conveyor spiral) is installed. Thus, as soon as the pulse response (output variable) of the vibratory conveyor device deviates from the reference behavior, a fault state has to be presumed.

On the basis of the unique characterization of the fault states (which also contain data from other sources), the corresponding fault can be derived therefrom and communicated.

Tolerance Band (121)

The activation of the exciter coil is a regulated system which can react by way of the feedback of the acceleration sensor to changeable vibration amplitudes (by more mass on the spiral) in that the voltage amplitude on the coil is adjusted by the frequency inverter. An incorrect amplitude regulation and thus defects in the drive device can occur due to external system faults such as a broken weld seam on the spiral or exceeding the maximum filling quantity in the spiral. Such misbehavior can be recognized early by the comparison of the present voltage amplitude to a predefined tolerance band. This also applies to the output frequency of the frequency inverter. In addition to the voltage amplitude and frequency, the present acceleration is also compared to a predefined tolerance band in order to recognize a possible malfunction of the acceleration sensor early.

Parameter Comparison (131)

A parameter comparison refers hereinafter to the further processing and combining of detected status variables from different data sources, with the goal of recognizing a tendency toward the approach of the detected parameter to its tolerance band limit.

For example, the temperature profile of the coil is analyzed over the service life, so that a statement can be made with respect to the required service intervals and the functionality of the vibratory conveyor device is thus ensured in the long term.

OPC UA (141)

OPC UA (Open Platform Communications United Architecture) refers to the standard introduced by the OPC foundation for a platform-independent and service-oriented (SOA) data exchange.

The vibratory conveyor device (dust extractor) can be protected by these newly evaluated data from damage, resulting damage, and improper operation. Moreover, the process reliability can be significantly improved by "predictive maintenance".

Further advantageous embodiments of the invention can be commented on as follows:

In one special embodiment, after step A5), the following step is executed: A6) activation of the starting procedure for operation using reduced starting drive power of the vibratory conveyor device. More difficult startup behavior of the device caused by a long shutdown time can thus be taken into consideration. A defect of the device due to increased mechanical strain during the starting of the drive device can thus be prevented.

In a further embodiment, the drive power of the drive device is reduced by the starting procedure and increased to 100% after a time period $\Delta t > 0$. The advantage is thus achievable that on the basis of the evaluation of the pulse response, more difficult startup behavior of the device caused by a long shutdown time can be taken into consideration when switching on the vibratory conveyor device, in that the drive power is automatically reduced, for example to 50%. After this so-called "soft start," the power can be increased to 100% after a predefined time. This measure prevents the vibratory conveyor device from being damaged by the long shutdown times.

In another embodiment, the drive power of the drive device is reduced to at most 80%, preferably to at most 50%.

In still another embodiment, after step A5), the following step is executed: A7) activating the starting procedure for operation without reduced starting drive power of the vibratory conveyor device.

In a further embodiment, the method comprises the following step before step A1): A0) generating a reference pulse response by applying a brief drive pulse to a drive device of the vibratory conveyor device, wherein the drive device is not subjected to increased mechanical strains.

In a further embodiment, the pulse response caused under step A2) by the vibratory conveyor device is detectable as a function of the time or as a function of the frequency of the pulse response by means of an acceleration sensor arranged on the vibratory conveyor device.

In another embodiment, after step B2) in operation of the vibratory conveyor device, the following steps are executed: B3) comparing the detected parameters to respective predefined tolerance bands by means of the computer; and B4) ascertaining by means of the computer whether: (i) the operation of the vibratory conveyor device will be continued without restrictions, or (ii) the operation of the vibratory conveyor device is to be suspended with an error message. The advantages of these tolerance bands are in particular that Deficiencies on the vibratory conveyor device, for example, broken weld seams, excessively high filling quantity, or fault states of the acceleration sensor are detectable. If the detected parameters voltage amplitude, frequency, and acceleration of the exciter system move outside the respective predefined tolerance bands, a potential fault state has to be presumed, which can damage the drive device. Switching off to protect the drive device from the damage can be initiated by way of the monitoring of the parameters; and overheating of the coil is prevented by permanent monitoring of the temperature at the exciter coil.

In another embodiment, after the operation of the vibratory conveyor device, the following steps are executed: C1) comparing the parameters, caused by the vibratory conveyor device, detected under steps B3) and B4) in operation of the vibratory conveyor device and passed on to the computer, such as voltage amplitude, frequency, acceleration, and temperature, to stored long-term data by means of the computer; and C2) ascertaining by means of the computer whether: a) a tendency toward change of the parameters is recognizable and a warning message is to be output; or b) the operation can be continued in a standard manner. The advantages achievable by this parameter comparison can be seen in that:

the present operating parameters are compared to the reference parameters in order to thus define the actual state for the further operation. The values are compared here to the reference parameters ascertained in the experiment with regard to temperature profile, acceleration, voltage amplitude, and frequency;

the process reliability can be increased by means of a parameter comparison, in that a change of a parameter toward its tolerance band boundary can be recognized over a longer time period, even if the value is presently still in the permissible tolerance range. Such a change can thus be recognized early, in contrast to the method in operation, and measures can be initiated; and a great potential for continuing development projects and customer-specific applications can be analyzed in that the ascertained data and recognitions of all constructed dust extractors are compiled.

In a further embodiment, the method comprises the further steps: D1) providing the ascertained parameters and data of the computer to a higher-order operating system via OPC UA; and D2) detecting the data input of the higher-order operating system. The advantages of transferring the data via UPC UA are above all that the ascertained process parameters and data can be transferred using OPC UA to higher-order operating systems and synchronous time stamps are thus also provided beyond the interface boundary; and error messages, associated documents for error correction, and also any information on process optimization can be displayed on the higher-order system.

In one particular embodiment of the drive device, the angle $\alpha$ is at least 120°, preferably at least 105°.

In a further embodiment of the drive device, the counterweight can be assembled from a selectable number of individual weights. The advantage is thus achievable that by adding or removing individual weights, the complete drive device can be assembled so that specific counterweights can be installed for the different conveyor heights from 800 to 2,000 mm.

In a further embodiment, the drive device additionally comprises a frequency inverter for applying a drive pulse, a signal evaluation unit for detecting the pulse response caused by a conveyor channel, and a computer.

A preferred use of the drive device according to the invention is its arrangement in a vibratory conveyor device for dusting and/or deburring tablets and capsules.

The invention and refinements of the invention are explained in more detail hereinafter on the basis of the partially schematic illustrations of an exemplary embodiment.

Figure 1A:
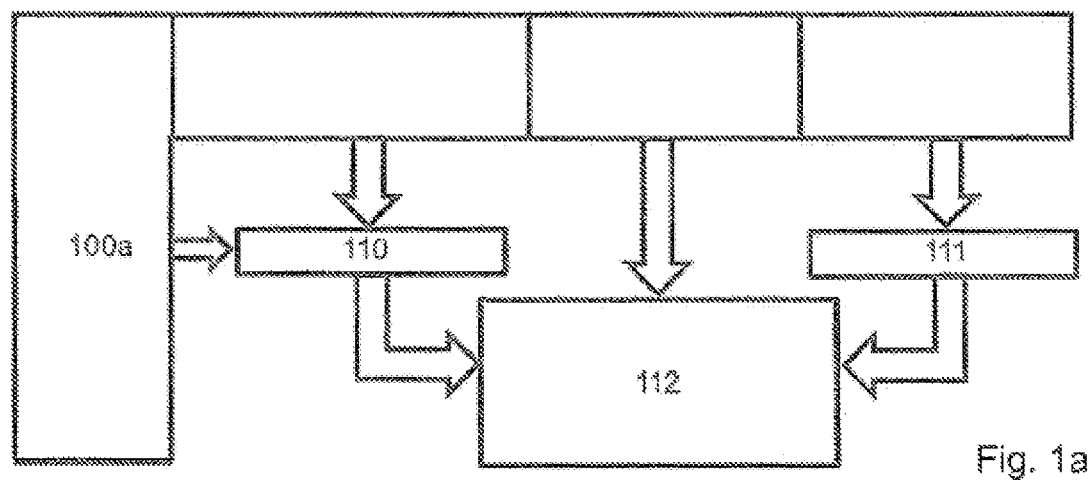
FIG. 1a shows a schematic illustration of an embodiment of the method according to the invention for checking the functionality of a vibratory conveyor device by means of a status analysis before operation.

An embodiment of the method according to the invention for checking the functionality of a vibratory conveyor device 1 (FIG. 2) by means of a status analysis 100a before operation is illustrated in FIG. 1a as an example.

The method 110 before operation is distinguished in that by means of a defined drive pulse on the drive device 2 (FIGS. 2 and 3) of the vibratory conveyor device 1 and the analysis of the resulting pulse response, a statement is made about the status of the vibratory conveyor device 1 immediately before operation.

The method 110 to be carried out before operation essentially comprises the following steps:
applying a drive pulse to a drive device 2 of the vibratory conveyor device 1 before operation of the vibratory conveyor device 1 by means of a frequency inverter 3 (FIG. 4);
detecting the pulse response caused by the vibratory conveyor device 1 as a function of the time or as a function of the frequency of the pulse response by means of a signal evaluation unit 5;
passing on the detected pulse response by way of the signal evaluation unit 5 to the computer 6 (FIG. 4);
comparing the detected pulse response to a reference pulse response 111 by means of the computer 6; and
lastly, it is ascertained by means of the computer 6 whether:
a) a starting procedure for operation with reduced starting drive power of the vibratory conveyor device 1 is to be activated, or
b) a starting procedure for operation without reduced starting drive power of the vibratory conveyor device 1 is to be activated, or
c) the operation is to be suspended.

The following status data 112 are detected here by means of the detected pulse response:
status of the conveyor channel 8;
supervision of the spring rate of the vibratory conveyor device 1; and
possible material fatigue.

Figure 1B:
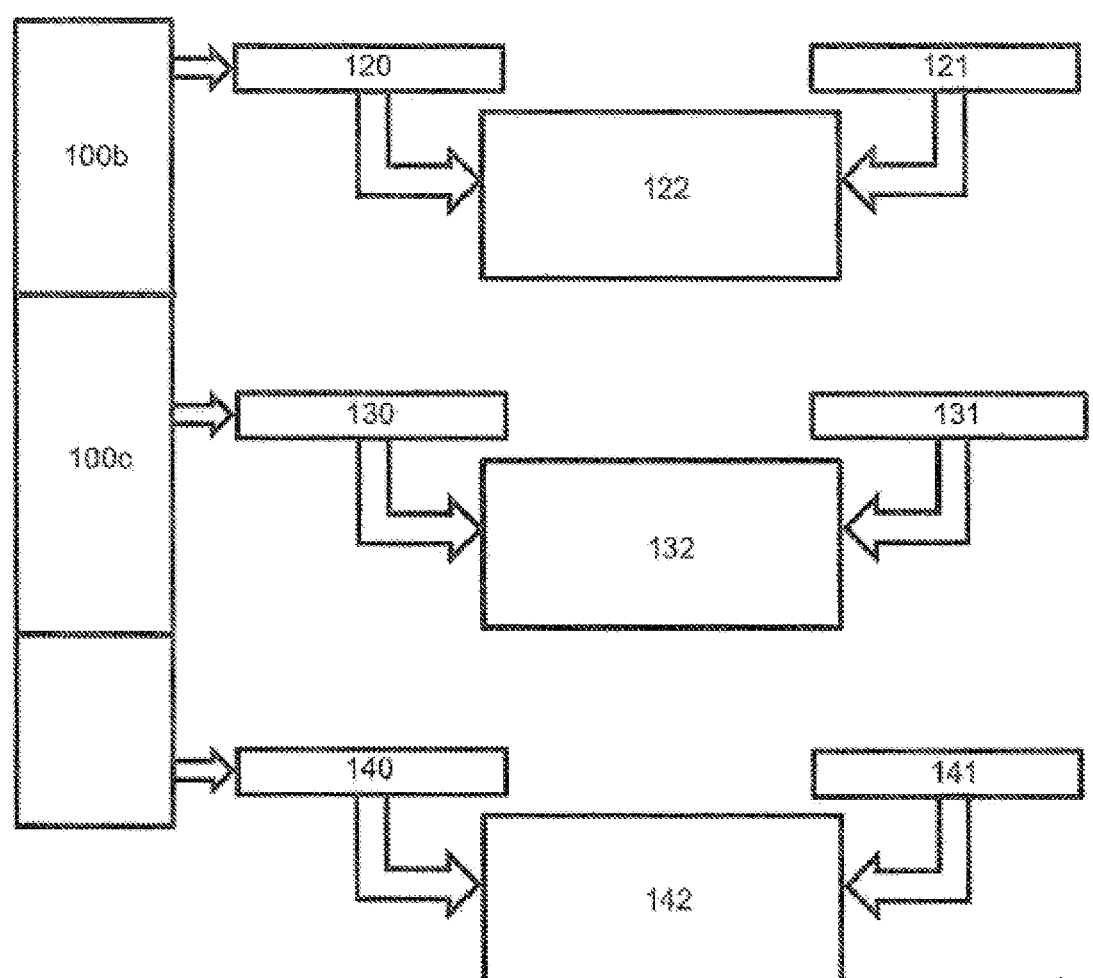
FIG. 1b shows a schematic illustration of an embodiment of the method according to the invention for checking the functionality of a vibratory conveyor device by means of a status analysis in each case during operation and after operation.

An embodiment of the method 120 according to the invention for checking the functionality of a vibratory conveyor device 1 by means of a status analysis 100b during operation is illustrated in FIG. 1b. In operation of the vibratory conveyor device 1, by means of the signal evaluation unit 5, the parameters caused by the vibratory conveyor device 1 such as coil temperature of the drive device 2, acceleration, frequency, and voltage amplitude in operation of the vibratory conveyor device 1 are detected and continuously monitored. Furthermore, the detected voltage amplitude, frequency, acceleration, and temperature are passed on by the signal evaluation unit 5 to the computer 6.

By way of example, and not restrictively, the method 120 in operation of the vibratory conveyor device 1 additionally comprises the following steps:
comparing the detected parameters to respective predefined tolerance bands 121 by means of the computer 6; and
ascertaining by means of the computer 6 whether:
a) the operation of the vibratory conveyor device 1 is to be continued without restrictions, or
b) the operation of the vibratory conveyor device 1 is to be suspended with an error message.

The check of the functionality is ensured by means of predefined tolerance bands 121 of the respective parameters. Furthermore, further status data 122, e.g., status of the weld seam and/or the filling quantity in the vibratory conveyor device 1 are ascertained from the detected parameters.

Also by way of example, and not restrictively, the method 130 for checking the functionality of a vibratory conveyor device 1 (FIG. 2) by means of a status analysis 100c after operation is additionally executed, which comprises the following steps:
comparing the parameters, which are caused by the vibratory conveyor device 1, detected in operation of the vibratory conveyor device 1 and passed on to the computer 6, such as voltage amplitude, frequency, acceleration, and temperature to stored long-term data 131 by means of the computer 6; and
ascertaining by means of the computer 6 whether:
a) a tendency toward change of the parameters is recognizable and a warning message is to be output; or
b) the operation can be continued in a standard manner.

The status analysis immediately after the operation comprises a parameter comparison and is primarily used to compare the detected present drive parameters to the respective starting values and to make a statement about the completed operation. Moreover, a statement is also made about the present status and further status data 132 for assessing the process reliability, service intervals, possible development potential, and customer-specific projects are again provided.

By means of the communication interface 140, the data are passed on via OPC UA 141 (Open Platform Communications United Architecture) to a higher-order operating system 4, by which the user can be informed about the present status of the vibratory conveyor device 1 or error states possibly emerging in future. Time stamps, process parameters, error messages, and documentation are transmitted as further status data 142.

Figure 2:
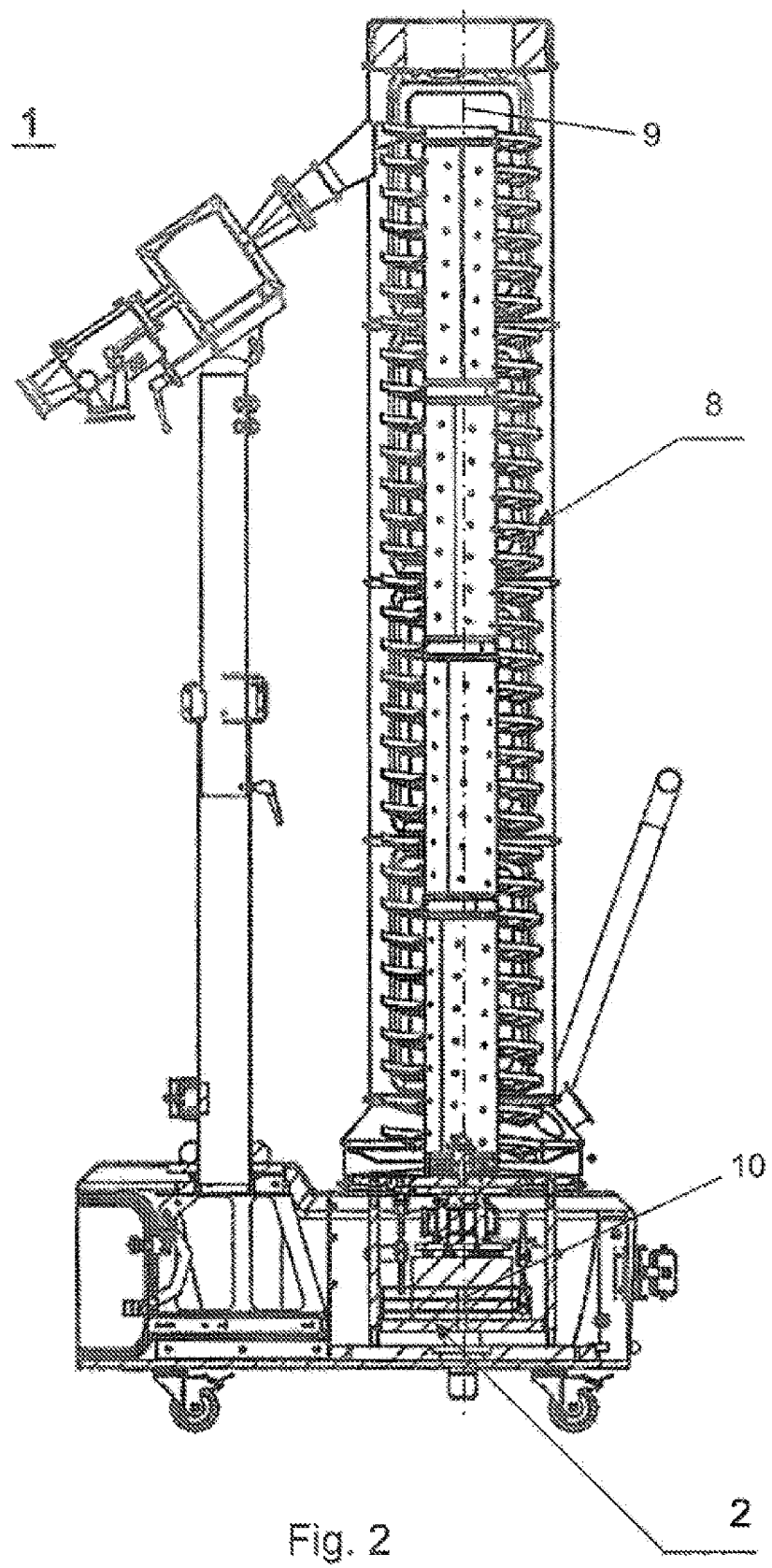
FIG. 2 shows a side view of a vibratory conveyor device together with an embodiment of the drive device according to the invention.

A vibratory conveyor device 1 having an embodiment of the drive device 2 according to the invention is illustrated in FIG. 2, wherein the vibratory conveyor device 1 comprises a helical conveyor channel 8 coaxial to a central axis 9 and, below the conveyor channel 8, a drive device 2 having a longitudinal axis 10 collinear to the central axis 9. For deburring and dusting, tablets or capsules are fed to the inlet of the conveyor channel 8 and travel due to the vibrations upward along the conveyor channel 8, where they finally leave the vibratory conveyor device 1 again through the outlet. On this path, the tablets or capsules are thoroughly vibrated through and rub against one another and against the walls of the conveyor channel 8 at the same time, wherein they lose any possible burrs due to this mechanical stress.

Figure 3:
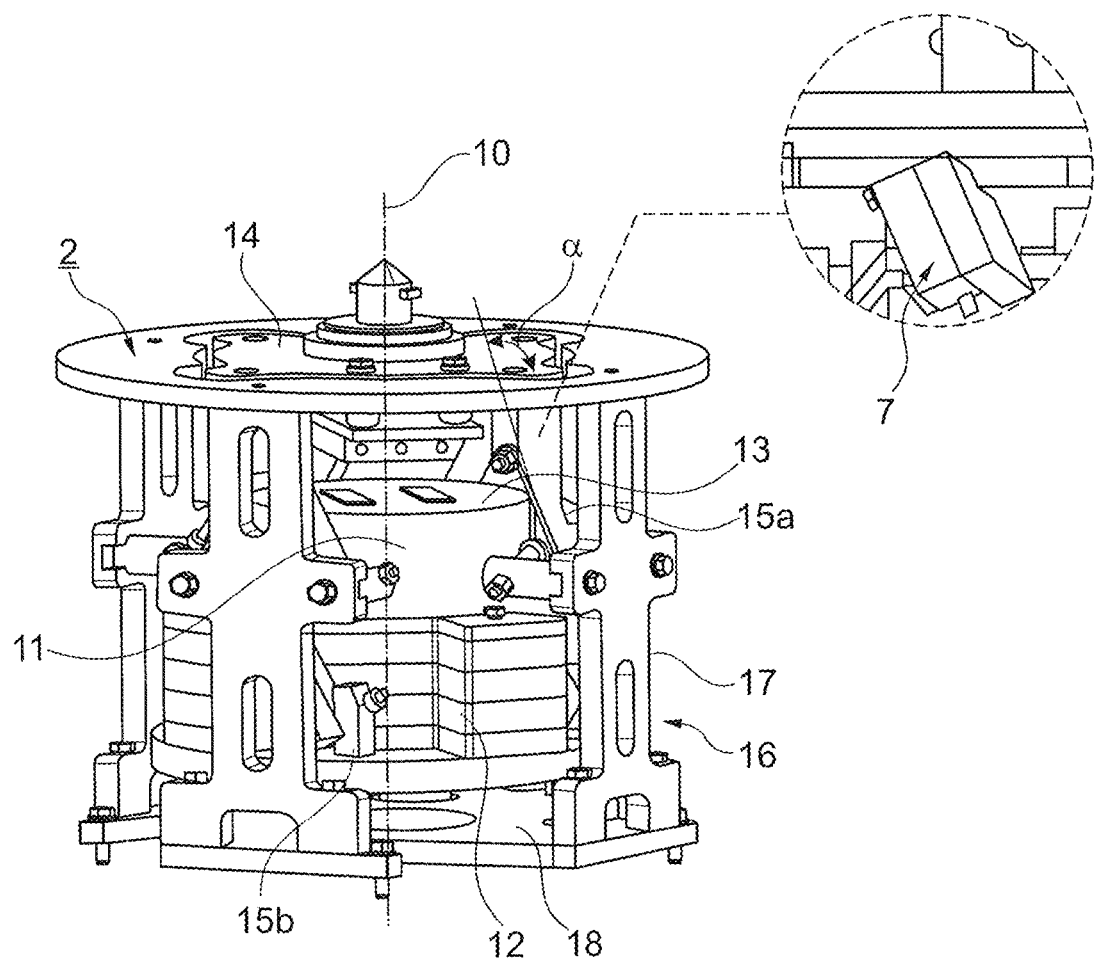
FIG. 3 shows a perspective illustration of the embodiment of the drive device according to the invention illustrated in FIG. 2.

An embodiment of the drive device 2 according to the invention is illustrated in FIG. 3, which essentially comprises a frame 16 having a longitudinal axis 10 extending in the vertical direction in operation of the drive device 2, a base plate 18, and multiple supports 17 arranged peripherally in a pitch circle on the base plate 18 and extending in the direction of the longitudinal axis 10, an armature plate 14, which is arranged at an upper end of the frame 16 and is connected to a support 17 so it can be horizontally and vertically vibrated by means of a first spring assembly 15a, a magnetic drive 13, which is arranged below the armature plate 14 and spaced apart therefrom, comprises a counterweight 11, and is connected by means of a second spring assembly 15b to a support 17, so that the armature plate 14 can be brought into vibration by magnetic force transmission. The counterweight can be assembled from a selectable number of individual weights 12. The magnetic force transmission from the magnetic drive 13 to the armature plate 14 takes place via a number of permanent magnets (not shown) arranged in or on the armature plate 14. The first and second spring assemblies 15a, 15b enclose, in the idle status of the drive device 2, by way of example and not restrictively an angle a of approximately 105° with the armature plate 14, so that the drive force exerted by the magnetic drive 13 on the armature plate 14 is divided into horizontal and vertical components. The conveyor channel 8 is brought into vibration by means of the magnetic drive 13 by the force transmission to the armature plate 14. The spring assemblies 15, on which conveyor channel 8 and counterweight 11 are suspended, are installed at a fixed angle in relation to the drive plane of the magnetic coil. In the ratio of the angle spring assembly 15/armature plate 14, an allocation of the drive forces on the armature plate 14 in the horizontal and vertical directions results at small amplitudes. Furthermore, an acceleration sensor 7 is attached to the fastening elements of the armature plate 14, on which the first spring assemblies 15a are fastened.

The mechanical structure of the drive device 2 is based on a counterweight 11. The vibration force compensation thus takes place via the counterweight system. The mass—the conveyor channel 8—vibrates precisely in opposition to the second mass—the counterweight 11—here. A transfer of the vibration forces to the external housing is reduced to a minimum by this compensation. The magnetic drive 13 is embedded completely with a temperature sensor (not shown) in the counterweight 11.

Figure 4:
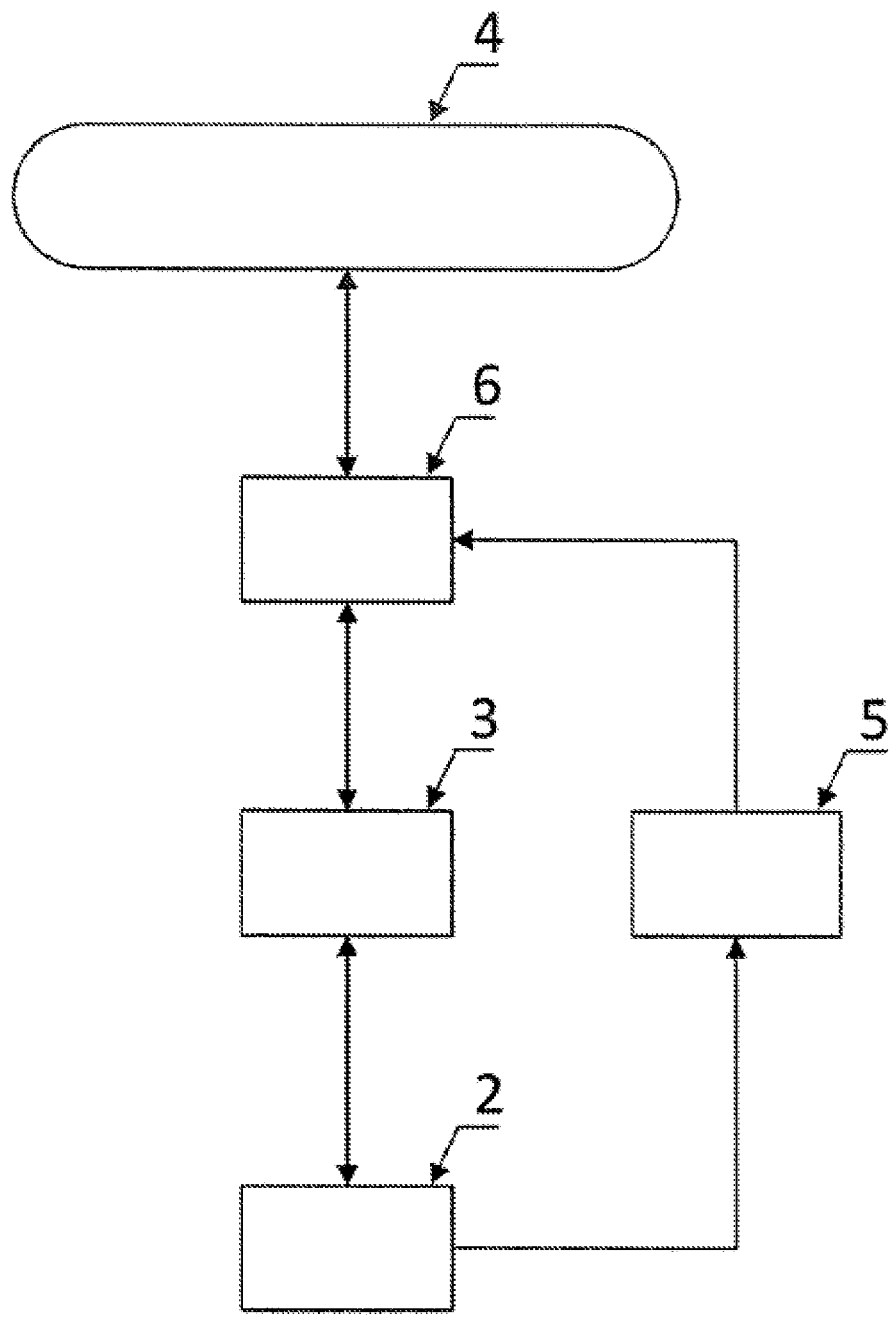
FIG. 4 shows a schematic illustration of the embodiment of the drive device according to the invention illustrated in FIG. 2 together with the peripheral devices.

As FIG. 4 shows, the drive device 2 in this embodiment additionally comprises a frequency inverter 3 for applying the drive pulse, a higher-order operating system 4, a signal evaluation unit 5 for detecting the pulse response, and a computer 6, which is suitably programmed for executing the method according to the invention described above.

The computer 6 comprises an OPC UA interface (Open Platform Communications United Architecture) for connection to a higher-order operating system 4, so that the vibratory conveyor device 1 can be used independently of producers, programming languages, and operating systems. The vibratory conveyor device 1 can thus be connected to any OPC UA tablet press and also to higher-order control systems without having to carry out changes. The uniform interfaces enable easy and quick access to data and applications and simplify the transmission of alarms and audit trails. Furthermore, the easy and secure transfer and collection of data of the drive device 2 enables improvement of the predictive maintenance. With the aid of the ascertained drive data, for example, the frequency range or the vibration amplitude, items of maintenance information can be derived, so that maintenance can be carried out proactively and any downtime can be minimized. In the optimum case, a malfunction or an incorrect operation can be predicted before effects or failures occur.

Among other things, the pulse response detected by the signal evaluation unit 5 is evaluated by the computer 6, so that, for example, even before operation, the status of the conveyor channel 8—for example, whether present or only partially installed—can be recognized and it can be established whether the spiral tower having the conveyor channel 8 is correctly constructed. Furthermore, not only can the correct installation of the spiral tower be checked, but items of information can also be obtained about the filling quantity of the conveyor channel 8.

The conveyor channel 8 of the vibratory conveyor device 1 can be completely emptied using an empty running mode. For this purpose, a corresponding low-vibration empty running program can be selected for different tablets or capsules and the conveyor channel 8 of the vibratory conveyor device 1 can be run completely empty in the low frequency range.

Although various embodiments of the present invention exist as described above, these are to be understood in such a way that the various features can be used both individually and also in any arbitrary combination. This invention is therefore not simply restricted to the above-mentioned, particularly preferred embodiments.

The invention claimed is:

1. A method for checking the functionality of a vibratory conveyor device that includes a drive device with a frame having a base plate arranged at a lower end of the frame and multiple supports arranged peripherally in a pitch circle on the base plate and extending in a direction of a longitudinal axis of the drive device, an armature plate arranged at an upper end of the frame, which is connected to the multiple supports such that the armature plate is both horizontally and vertically vibratable by a first spring assembly, an acceleration sensor coupled to the armature plate, and a magnetic drive arranged below the armature plate and spaced apart therefrom, said magnetic drive comprising a counterweight, and said magnetic drive being connected by a second spring assembly to the multiple supports such that the armature plate is vibratable by magnetic force transmission, wherein the first and second spring assemblies enclose an angle $\alpha > 90°$ with the armature plate in an idle status of the drive device such that the drive force exerted by the magnetic drive on the armature plate is dividable into horizontal and vertical components, a frequency inverter, a signal evaluation unit, and a computer, the method comprising:

(A) carrying out a status analysis before operation of the vibratory conveyor device by means of steps comprising:

(A1) applying a drive pulse to the drive device of the vibratory conveyor device before operation of the vibratory conveyor device with the frequency inverter;

(A2) detecting a pulse response caused by the vibratory conveyor device as a function of the time or as a function of a frequency of the pulse response with the signal evaluation unit;

(A3) passing the detected pulse response from the signal evaluation unit to the computer;

(A4) comparing, using the computer, the detected pulse response to a reference pulse response;

(A5) determining, using the computer, based on the comparison made in step (A4), whether to:
  (a) activate a starting procedure for operation with reduced starting drive power of the vibratory conveyor device, or
  (b) activate a starting procedure for operation without reduced starting drive power of the vibratory conveyor, or
  (c) suspend operation; and (A6) activating the starting procedure for operation with reduced starting drive power of the vibratory conveyor device, activating the starting procedure for operation without reduced starting drive power of the vibratory conveyor device or suspending operation based on the determination made in step (A5); or (B) carrying out the status analysis during operation of the vibratory conveyor by means of steps comprising:
  (B1) detecting voltage amplitude, frequency, acceleration, and temperature parameters caused by the vibratory conveyor device in operation of the vibratory conveyor device with the signal evaluation unit;
  (B2) passing the detected voltage amplitude, frequency, acceleration, and temperature parameters from the signal evaluation unit to the computer;
  (B3) comparing the detected voltage amplitude, frequency, acceleration, and temperature parameters to respective predefined tolerance bands using the computer;
  (B4) determining, using the computer, based on the comparison made in step (B3), whether to:
    (a) continue operation of the vibratory conveyor device without restrictions; or
    (b) suspend operation of the vibratory conveyor device with an error message; and
  (B5) continuing operation of the vibratory conveyor device without restrictions or suspending operation of the vibratory conveyor device with an error message based on the determination made in step (B4).

2. The method as claimed in claim 1, wherein the drive power of the drive device is initially reduced by the starting procedure and subsequently increased to 100% after a time period Δt>.

3. The method as claimed in claim 1, wherein the drive power of the drive device is reduced up to 80%.

4. The method as claimed in claim 1, wherein the drive power of the drive device is reduced up to 50%.

5. The method as claimed in claim 1, wherein the method comprises the following step before step (A1):
  (A0) generating a reference pulse response by applying a brief drive pulse to the drive device of the vibratory conveyor device when the drive device is not subjected to increased mechanical stresses.

6. The method as claimed in claim 1, wherein the signal evaluation unit that detects the pulse response caused in step (A2) by the vibratory conveyor device is an acceleration sensor arranged on the vibratory conveyor device.

7. The method as claimed in claim 1, wherein during continuing operation of the vibratory conveyor device without restrictions, the method further comprises executing steps of:
  (C1) comparing the detected voltage amplitude, frequency, acceleration, and temperature parameters detected in step (B1) during operation of the vibratory conveyor device to stored long-term data using the computer;
  (C2) determining, using the computer and based on the comparison made in step (C1), whether:
    (a) there is a tendency toward change of the detected voltage amplitude, frequency, acceleration, and temperature parameters; or
    (b) there is no tendency toward change of the detected voltage amplitude, frequency, acceleration, and temperature parameters; and
  (C3) outputting a warning message when it is determined in step (C2) that there is a tendency toward change of the detected voltage amplitude, frequency, acceleration, and temperature parameters and continuing operation of the vibratory conveyor in a standard manner when it is determined in step (C2) that there is no tendency toward change of the detected voltage amplitude, frequency, acceleration, and temperature parameters.

8. The method as claimed in claim 1, further comprising steps:
  (D1) providing the detected voltage amplitude, frequency, acceleration, and temperature parameters and data of the computer to a higher-order operating system via OPC UA; and
  (D2) detecting the data input by way of the higher-order operating system.

* * * * *

UNITED STATES PATENT AND TRADEMARK OFFICE
CERTIFICATE OF CORRECTION

| | | |
|---|---|---|
| PATENT NO. | : 12,460,997 B2 | Page 1 of 1 |
| APPLICATION NO. | : 17/919140 | |
| DATED | : November 4, 2025 | |
| INVENTOR(S) | : Mario Rütti et al. | |

It is certified that error appears in the above-identified patent and that said Letters Patent is hereby corrected as shown below:

In the Claims

In Column 9, Line 45, delete "period $\Delta t >$." and insert --"period $\Delta t > 0$"--

Signed and Sealed this
Tenth Day of February, 2026

John A. Squires
*Director of the United States Patent and Trademark Office*